Dec. 7, 1954

L. S. VERMILLION 2,696,585

DYNAMOELECTRIC MACHINE

Filed Oct. 24, 1951

3 Sheets-Sheet 1

INVENTOR.
Lewis Safford Vermillion
BY William B. Jaspert
Attorney.

Dec. 7, 1954   L. S. VERMILLION   2,696,585
DYNAMOELECTRIC MACHINE
Filed Oct. 24, 1951   3 Sheets-Sheet 3

INVENTOR.
Lewis Safford Vermillion
BY William B. Jaspert
Attorney.

2,696,585

DYNAMOELECTRIC MACHINE

Lewis Safford Vermillion, Pittsburgh, Pa.

Application October 24, 1951, Serial No. 252,897

2 Claims. (Cl. 322—47)

This invention relates to new and useful improvements in dynamoelectric machines, and the present invention is an improvement in the type of dynamoelectric machine disclosed in Patent No. 2,564,741, granted to me August 21, 1951.

In the aforementioned patent there is disclosed a dynamoelectric machine having a rotating field and a rotating armature revolving in opposite directions to generate a given electromotive force with electrical windings and magnetic cores of approximately one-half the size and capacity of that normally required in a conventional form of apparatus, or to increase the electromotive force or capacity of a conventional form of apparatus in which only the field or the armature revolves.

In accordance with my present invention, a stationary armature is employed in addition to a rotating armature and a rotating field whereby the machine acts as an induction generator that will induce an alternating E. M. F. as a counter E. M. F. in which the power factor and other characteristics of induced E. M. F. are improved over conventional types of induction generators.

The apparatus may further be employed as a magnetic clutch or it may be operated as motor having two drive shafts operating at the same speeds and torque in opposite directions.

The apparatus generates alternating current also without the use of slip rings.

Figure 1:
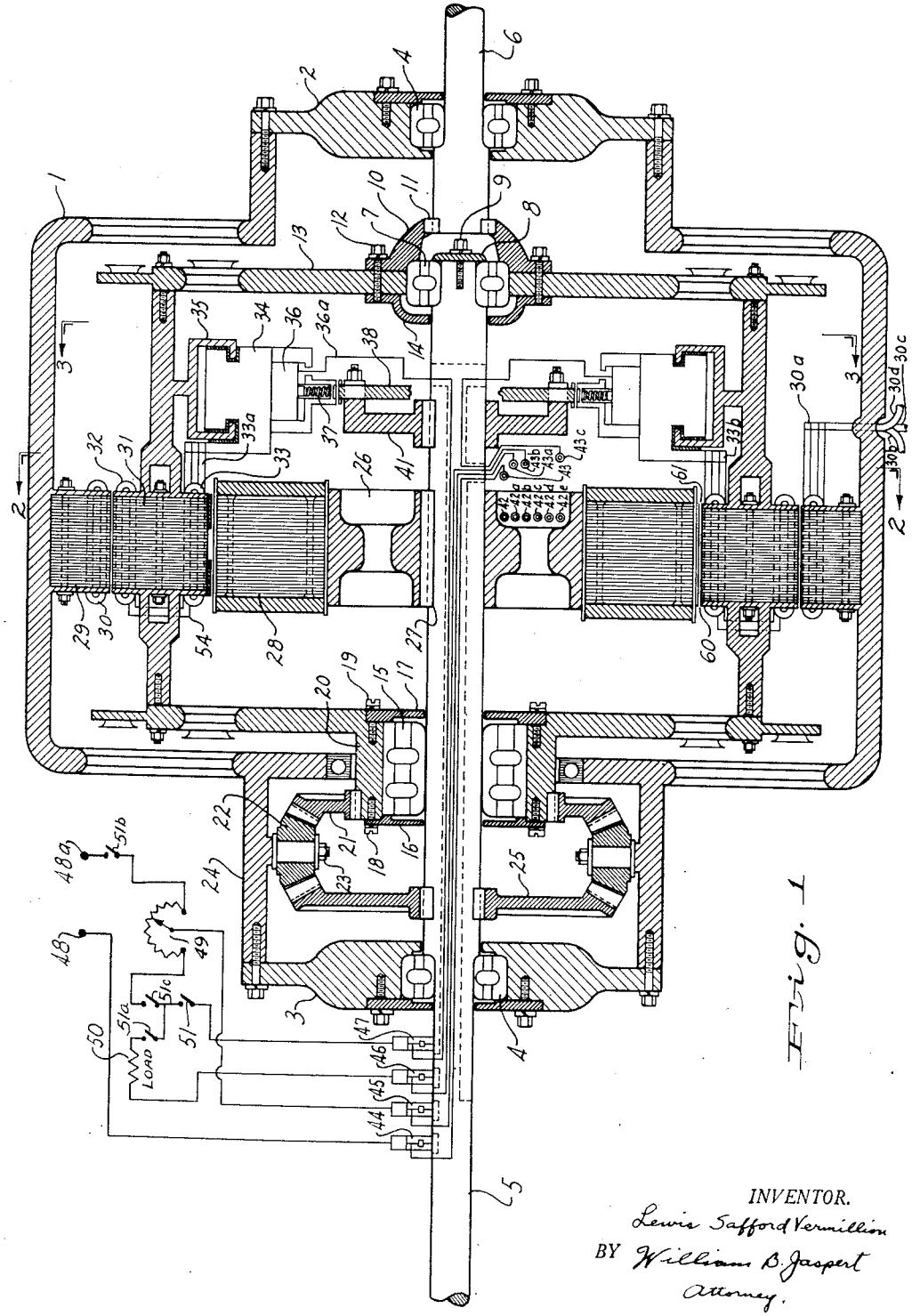
Figure 2:
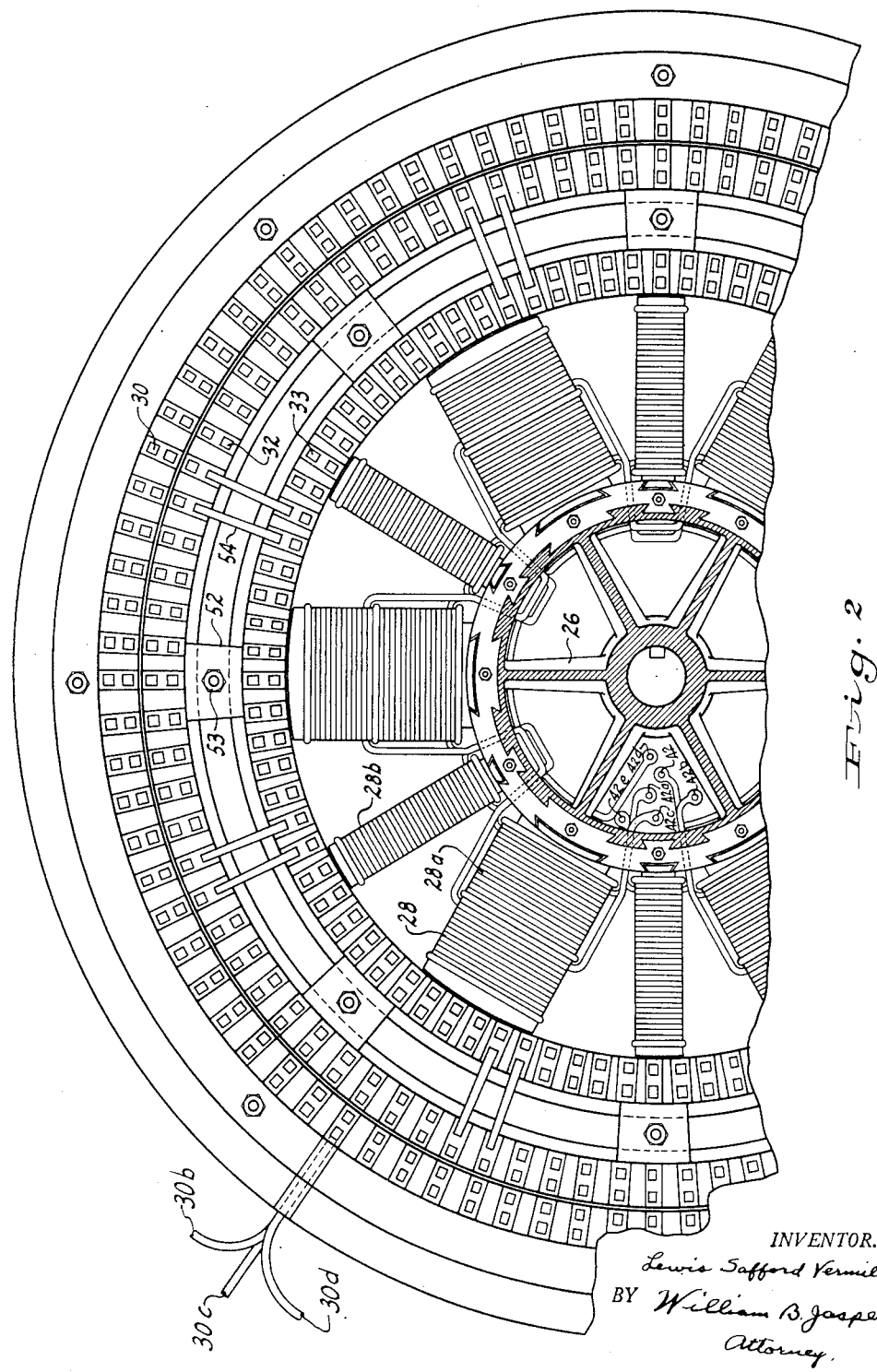
Figure 3:
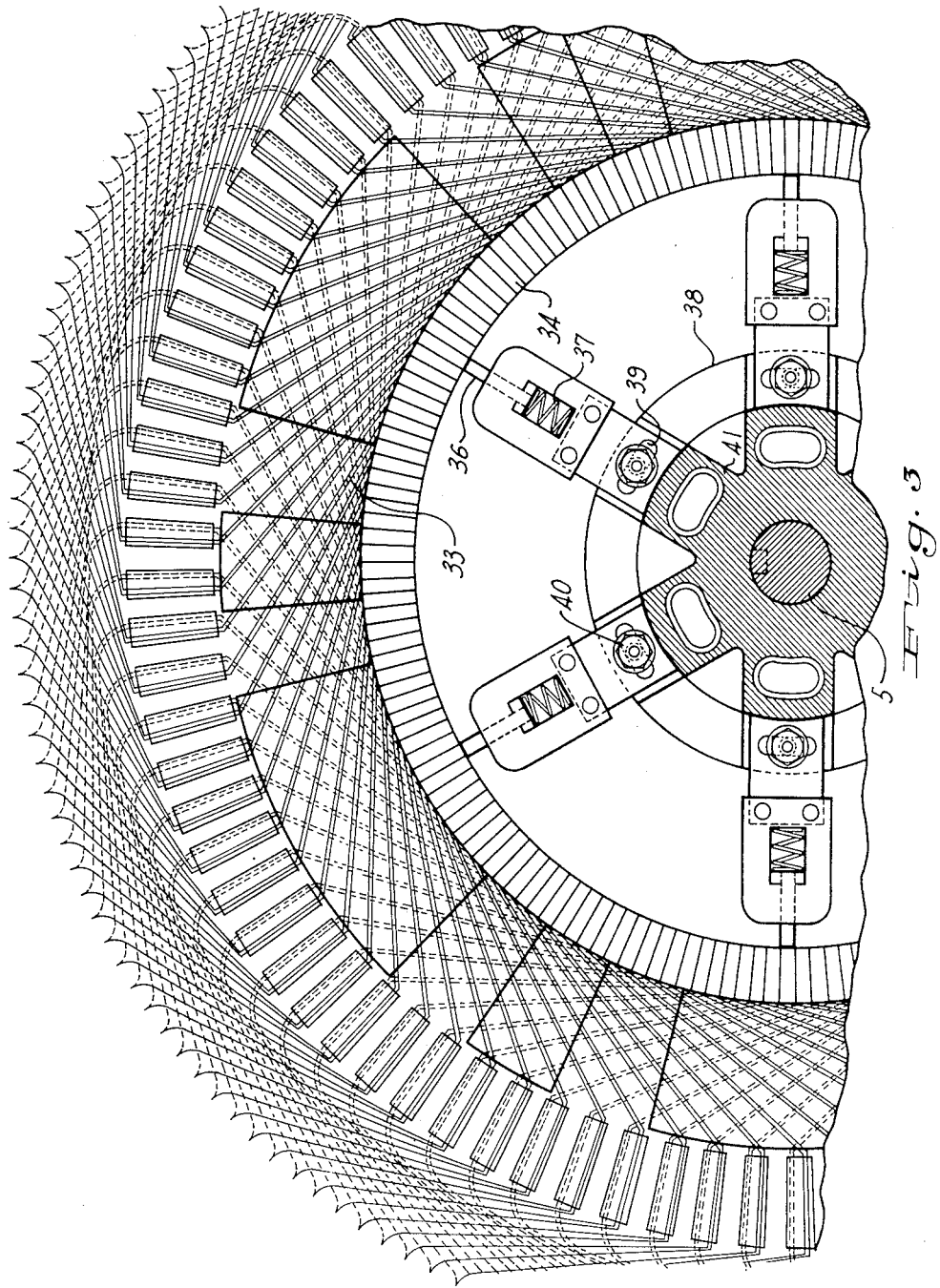

The invention will become more apparent from a consideration of the accompanying drawings, constituting a part hereof, in which like reference characters designate like parts, and in which Fig. 1 is a vertical cross-sectional view along the longitudinal axis of a dynamoelectric machine embodying the principles of my invention;

Fig. 2 is a vertical section, partially in elevation, taken along the line 2—2 of Fig. 1; and Fig. 3 is a cross-sectional view, partially in elevation, taken along the line 3—3 of Fig. 1.

With reference to the several figures of the drawings, the numeral 1 designates a stationary housing having end brackets 2 and 3 with antifriction bearings and seals 4 for journalling a shaft 5 and a shaft 6. Shaft 5 is mounted at one end in a sealed bearing 7 to which it is attached by a flange 8 fastened by bolt 9. A flange 10 is keyed at 11 to the shaft 6 and is fastened by bolts 12 to one end of a cage 13. A bearing shield 14 is secured by the bolt 12 to the end of the cage 13. The other end of the cage 13 is journaled by a sealed bearing 15 which is protected by the seals 16 and 17 secured by screws 18 and 19, respectively. One end of the cage 13 is provided with a sleeve 20 on which is mounted a bevel gear 21 having teeth interacting with idler gears 22 journaled on stud shafts 23 extending from a gear box 24. A bevel gear 25 is keyed to shaft 5, as shown, to rotate therewith, whereby shaft 5 rotates in the opposite direction to the direction of rotation of the cage 13. Since the shaft 6 is keyed at 11 to the bracket 10 fastened to cage 13, shaft 6 will rotate in the same direction as the cage 13 so that under present conditions shafts 5 and 6 will be rotating in opposite directions.

Mounted on shaft 5 is a spider 26 which is keyed to shaft 5 at 27. The spider carries a plurality of magnetic series, shunt, and commutator field coils, generally designated by the numeral 28, which will be hereinafter described. Mounted on the stationary housing 1 is a stationary armature, generally designated by the numeral 29, having coils 30. Mounted on the cage 13 is an armature generally designated by the numeral 31 with coils 32 and 33. A plurality of commutator segments 34 are carried in a cage ring 35 of the member 13 and brushes 36 are mounted in contact with the commutator segments 34 by springs 37. The brushes are mounted on a rocker ring 38 having slots 39 as shown in Fig. 3 by which the ring is angularly adjustable by the use of clamping bolts 40. The rocker ring is carried by a spider 41 that is keyed to shaft 5 as shown in Figs. 1 and 3. In Fig. 3 the coils 33 are shown connected to the commutator segments.

In Fig. 2 the spider 26 is shown carrying the series field and shunt coils 28 and 28a and the commutator coils 28b. These coils are shown connected to a group of terminals designated by the reference characters 42, 42a, 42b, 42c, 42d and 42e. They are also shown in Fig. 1 of the drawings for connection with a group of terminals 43, 43a, 43b and 43c, leading to collector rings 44, 45, 46 and 47 that are electrically connected to a source of E. M. F. 48 through a rheostat 49, a load 50 and a group of switches generally designated by the numeral 51. The coils 30 of the stationary armature and the coils 32 and 33 of the rotating armature are shown in Fig. 2. They are all mounted in laminations and discs to minimize eddy currents and hysteresis losses. These coils are held in place by an end shield 52 and bolts 53. Coils 32 and 33 are provided with electrical connections 54, which is also shown in Fig. 1 of the drawings, whereby the current in the coils 32 has the same value as the current in the coil 33, and this current and flux is cut by the stationary armature coil 30. The coil 30 is connected to a circuit 30a at the bottom of Fig. 1 and alternating current is delivered at the terminals 30b, 30c and 30d. If the riser 54 is removed, the coils 30 and 32 will act as a primary and secondary transformer coil. By short-circuiting the coil 33 at 33a and 33b, the dynamoelectric machine can be made to produce alternating current only.

In operation the shaft 6 may be driven by a prime mover to which it is coupled in a conventional manner. Rotation of shaft 6 causes cage 13 to revolve which through the sleeve 20 and the connected gearing drives shaft 5 to cause it to revolve in the opposite direction, thereby causing the field coil 28 and coils 28a and 28b to rotate in the direction opposite to the direction of rotation of the revolving armature 31 carrying coils 32 and 33. Alternating current will flow through the circuit 30a to the stator winding 30 for field excitation and flows out of the same circuit as a counter E. M. F. The drive shaft 6 is driven at a speed which causes winding 32 to rotate above the synchronous speed of the rotating field set up by windings 30 when energized from an alternating current power line. The rotor windings 32 and 33 will induce a counter E. M. F. which will cause current to flow back into the alternate current system through circuit 30a.

Self excitation

When this generator is self excited current will flow in the field windings 28 and 28a producing a flux or lines of force which upon rotation of the spider 26 cuts the armature coils 33 and induces an E. M. F. therein. This E. M. F. causes current to flow in the coils 33 and also in the coils 32 by way of connections 54. Current flowing in windings 32 sets up a field or flux which cuts the winding 30 inducing an E. M. F. therein, and if terminals 30b, 30c, and 30d are connected to a load, alternating current will be delivered to the load.

The current which is caused to flow in the coil 33 by this induced E. M. F. is alternating current and flows out to the connections 33a, Fig. 1, of the commutator segments 34, where it is rectified into direct current and flows or passes into the positive brushes 36 and into the circuit 36a through the shaft and to the brush and collector ring 47, then to the points of switch 51 and rheostat 49, where "all" the current goes through the circuit to and through the brush and ring 45 through the circuit and shaft to the terminal 43a, where it is connected to the terminal shunt 42 and caused to flow through the shunt field coils 28a to terminal 42a, Fig. 1. Terminal 42a is then connected to terminal 42d of the commutating coils 28b of Fig. 2, then to terminal 42e in Fig. 1. Terminal 42e is connected to terminal 43c which in turn is connected through circuit 36a to the negative brush 36 to and through the commutator segments 34, where it is changed to alternating current, then through the connection 33a to the armature coils 33 where it started. The brushes and commutator bars are alternately positive and negative in the manner of their connection to positive and negative field coils.

Therefore, we traced the circuit through the armature winding, through the circuit and rheostat and the shunt field and both positive and negative brushes and commutator segments back to the armature winding.

By closing the switch at 51, the load 50 shown in Fig. 1 is connected in the circuit, which causes part of the current to return and flow through the circuit to and through the brush and slip ring 46, through the circuit in the shaft to terminal 43b, where it is connected to the terminal 42b. It then flows through the series field coils 28, Fig. 2 to the end of this circuit to terminal 42c, Fig. 1.

Terminals 42a and 42c are then connected to the beginning of the commutating coil circuit terminal 42d, Fig. 1, which causes the current to flow from both the shunt field circuit and the series field circuit to and through the commutating coil field circuit to terminal 42e, and then, as before, to terminal 43c where the current takes the same route as before explained, to the negative brush and commutator segments to coils 33.

When the load is connected, the current is "divided" and part of the current flows through the returning circuit from the rheostat through the shunt field to the commutating coil circuit. The other part flows through the returning circuit from the load through the series field to the commutating coil circuit.

With the shaft 5 or 6 attached to a prime mover to effect rotation, and the electrical circuit arranged as just described, the direct current windings of the machine will act and operate as a compound generator.

Separately excited

When the machine is separately excited from an independent source of direct current and is operating as a generator, direct current flows through the shunt field and circuit independently, flowing from terminal 48a, Fig. 1, through the switch 51b, through the rheostat 49, through the circuit and brush and ring 45, through the circuit in the shaft to the terminal 43a, which connects on to terminal 42, through the shunt field coils and circuit to terminal 42a, which then connects to terminal 43, through the circuit in the shaft to brush and ring 44, through the circuit to terminal 48, from where it started.

As an alternating E. M. F. is induced in coil 33, and causes alternating current to flow therein, as before stated, it also causes current to flow to and through the connections at 33a to the positive commutator segments 34 and brushes 36, where it is rectified into direct current and flows through the circuit at 36a through the circuit in the shaft to and through the ring and brush at 47, through the switch 51 and 51a to and through the load at 50, returning through the circuit to ring and brush 46 through the circuit in the shaft to terminal 43b, where it is connected to the beginning end of the series field coils and circuit 42b, through the series field circuit to terminal 42c, which is connected to terminal 42d, through the commutating coil circuit to terminal 42e, then to terminal 43c through the circuit to negative brush 36 and commutator segments 34 where the direct current is again rectified into alternating current and connections 33a to coil 33, where it started.

The commutator acts as a rectifier from direct current to alternating current and from alternating current to direct current.

Therefore, when the machine is separately excited, the shunt field circuit is independently excited. The series field circuit is connected in series with the commutator coils and is excited more or less in accordance with the load that is carried.

However, those experienced in the art can see that the fields and windings of this machine can be connected in different ways to effect different results.

The commutator coils or field acts to aid commutation only.

The rocker ring 38 that supports the brushes can be shifted, or moved back or forward by loosening the bolts 40. This is done to find and effect the magnetic neutral, and the magnetic balance of the machine for either no load or full load, and to aid commutation or sparking and arcing at the brushes, and to help build up the voltage to the value needed, as is done in engineering and test practices.

The alternating current end

In this invention, an attempt has been made to generate an alternating current with, or at the same time a direct current is generated. Also to eliminate as much as possible slip rings and brushes to accomplish this, we are improving the induction generator by adding additional windings.

In an alternating current induction generator the stator winding is connected to the A. C. system and the rotor shaft is connected or attached to a prime mover and driven above synchronous speed. The rotor winding will generate a counter E. M. F., which will flow back into the alternating current system. The excitation that is used for the field is the E. M. F. in the alternating current system. The power factor is the per cent of watts power that is useful to the wattless power that is useless. In other words, there is a certain per cent of wattless power that is always flowing through all alternating current systems and is caused by inductance in the system, and in the general cases it is very low. Therefore, with such a low power factor in the E. M. F. of the field excitation of the alternating current induction generator would cause the power factor of the counter E. M. F. to be low, and this is one of the many reasons why this generator is not much used.

In brief, this generator takes the E. M. F. from the alternating current system and puts it back as a counter E. M. F. but with a very low power factor.

But in this invention the flux from the field coils 28b and 28a, Fig. 2 and coils 28, Fig. 1, cuts the coils 33 and induces an E. M. F. therein. This E. M. F. causes current to flow in coils 32 by way of connections 54. Current flowing in coil 32 sets up a field or flux which cuts the coil 30 inducing an E. M. F. therein. Coil 30 is, of course, stationary and located inside of frame 1. When this E. M. F. is induced into coil 30 it is established at terminals 30b, 30c and 30d in Figs. 1 and 2. Therefore, the only inductance would be between the field coils shown at 28 and coil 33 and that between coil 32 and 30.

However, if the risers is severed or broken, the E. M. F. between the coils 33 and 32 will be about the same as if they were connected, due to the inductance, because the coils 33 and 32 and the laminations will act as a transformer with its primary and secondary.

Windings 30, 32, and 33 are polyphase or 3 phase windings which have three separate circuits spaced 120 electrical degrees apart interconnected internally with only three leads brought out to form the machine's A. C. terminals 30b, 30c and 30d, as shown.

The field set up by winding 32 will definitely travel in the same direction as the winding.

The frequency or the rise and fall of the flux of the alternating current system of this machine will depend upon the speed of the machine and upon the design of the gears and windings which can be effected mostly as desired.

The power factor that is as near unity as possible is the desire of all engineers and companies, as the lower the power factor the more wattless current there is flowing through the alternating current system; while the higher the power factor toward unity, the more watts power there is flowing through the system.

It is evident from the foregoing description of my invention that by using the machine as a generator and attaching a prime mover to either shaft, both direct and alternating current can be effected from their respective sources, and mechanical power can be effected in the form of opposite rotation from the other unattached shaft.

By using the machine as an alternating current motor, alternating current can be effected from the alternating current side with the frequency desired, and mechanical power from two different directions of rotation from the two shafts can be effected.

By using the machine as a direct current motor, direct current can be effected from the direct current side and mechanical power from the two different rotations or directions can be effected from the two different shafts.

By placing the gears in the gear box as shown at the end, they are easier to get to for repairs and maintenance, and keep the possibility of getting oil on the windings; also, there is the possibility of circulating oil or a lubricant from the gear box, through the shaft to the bearings at the other end of the shaft (not shown).

By eliminating one or more or all the gears and making the shafts free and independent to rotate, and by placing a perforated ring or a plurality of iron or steel rings 60 and 61 on the inner face of the rotating armature below the coil 33, the flux would act upon the ring in the form or effect as eddy currents and at the same time induce flux in the coil 33 if desired. This machine can operate as a slip and torque magnetic clutch and can generate power at the same time if it is desired. The speeds would be the same or different in R. P. M., in the same or in opposite directions and the machine could be used as a ship propeller drive or in any manner where a prime mover is attached to one shaft and a driven member to the other.

By short-circuiting the coils 33 at points 33a and 33b in Fig. 1, this machine can operate or can be made to generate alternating current or E. M. F. only when used as a generator.

It also can be made to be used as a repulsion induction motor or generator. Also by not rotating the machine, alternating current can be applied to coil 33 or to coil 30 for use as a transformer.

Although one embodiment of the invention has been herein illustrated and described, it will be evident to those skilled in the art that modifications may be effected in the mechanical and electrical features and in the mode of application or uses to which the device may be put without departing from the principles herein set forth.

I claim:

1. In a dynamoelectric machine, a plurality of shafts in coaxial alignment journaled in and projecting from a stationary housing, a cage mounted in said housing coupled for rotation with one of said shafts and a first spider mounted on the other of said shafts, said last-named shaft and cage being connected by two beveled gears having an interposed idler gear to cause said last named shaft and cage to rotate in opposite directions, an armature winding mounted on said stationary housing, a second and third armature winding mounted in coaxial relationship to each other for rotation with the cage, and a field winding mounted on said first spider, said second and third armature windings being mounted respectively on the inside and the outside of said cage and having a shunt element adapted to join said second and third armature windings, the second named armature winding being electrically connected to a plurality of commutator bars within said cage and the stationary armature winding being electrically connected to an alternating current circuit, a second spider mounted on the said other of said shafts carrying a plurality of brushes for engagement with the commutator bars of the second named armature, and a control circuit electrically connected to said brushes and to the field winding to constitute the dynamo electric machine an induction generator to generate alternating current as a counter E. M. F. flowing back through the alternating current circuit of the stationary armature to improve the current characteristics of said circuit by driving said cage slightly above synchronous speed when said shunt is operative to join said second and third armature windings.

2. In a dynamoelectric machine, a plurality of shafts in coaxial alignment journaled in a stationary housing, a cage mounted in said housing coupled for rotation with one of said shafts and a first spider mounted on the other of said shafts, said last named shaft and cage being connected by two beveled gears having an interposed idler gear to cause said last named shaft and cage to rotate in opposite directions, an armature winding mounted on said stationary housing, a second and third armature winding mounted in coaxial relationship to each other for rotation with the cage, and a field winding mounted on said first spider, the second named armature winding being electrically connected to a plurality of commutator bars and the stationary armature winding being electrically connected to an alternating current circuit, a second spider mounted on the said other of said shafts carrying a plurality of brushes for engagement with the commutator bars of the second named armature, a rocker ring mounted on said spider, said brushes angularly spaced on said rocker ring for engaging the said commutator bars, said rocker ring being angularly adjustable, and a control circuit electrically connected to said brushes and to the field winding to constitute the dynamo electric machine an induction generator to generate alternating current as a counter E. M. F. flowing back through the alternating current circuit of the stationary armature to improve the current characteristics of said circuit by driving said cage slightly above synchronous speed.

References Cited in the file of this patent

UNITED STATES PATENTS

| Number | Name | Date |
| --- | --- | --- |
| 859,368 | Collins | July 9, 1907 |
| 912,144 | Mavor | Feb. 9, 1909 |
| 1,017,510 | Casterline | Feb. 13, 1912 |
| 1,491,441 | Thomson | Apr. 22, 1924 |
| 1,562,263 | Sommer | Nov. 17, 1925 |
| 1,893,629 | Masterson et al. | Jan. 10, 1933 |
| 2,388,955 | Couse | Nov. 13, 1945 |
| 2,465,006 | Bowes et al. | Mar. 22, 1949 |
| 2,563,577 | Bowes et al. | Aug. 7, 1951 |
| 2,564,741 | Vermillion | Aug. 21, 1951 |

FOREIGN PATENTS

| Number | Country | Date |
| --- | --- | --- |
| 345,137 | Great Britain | Mar. 19, 1931 |